United States Patent [19]

Leinweber

[11] Patent Number: 4,900,240

[45] Date of Patent: Feb. 13, 1990

[54] APPARATUS FOR PRESSING CURVED BRAKE LININGS, ESPECIALLY FOR DRUM-TYPE BRAKES

[75] Inventor: Johann Leinweber, Wiener Neustadt, Austria

[73] Assignee: Ing. Johann Leinweber Anstalt fur Mechanik, Wiener Neustadt, Austria

[21] Appl. No.: 284,902

[22] Filed: Dec. 15, 1988

[30] Foreign Application Priority Data

Dec. 15, 1987 [AT] Austria ................. 3308/87

[51] Int. Cl.$^4$ ............................................. B29C 43/20
[52] U.S. Cl. ................... 425/110; 156/583.1; 264/120; 264/125; 264/241; 264/263; 425/126.1; 425/127; 425/406; 425/444
[58] Field of Search .................... 156/228, 583.1; 264/120, 123, 125, 126, 232, 236, 241, 263; 425/110, 116, 126.1, 127, 128, 256, 258, 259, 406, 444

[56] References Cited

U.S. PATENT DOCUMENTS

| | | | |
|---|---|---|---|
| 2,963,993 | 12/1960 | Stott | 425/126.1 |
| 3,255,279 | 6/1966 | Smith | 264/120 |
| 3,537,141 | 11/1970 | Burnes | 425/256 |
| 3,555,730 | 1/1971 | Brink | 425/128 |
| 3,591,903 | 7/1971 | Bowles | 425/256 |
| 3,881,982 | 5/1975 | Morgan, Sr. et al. | 156/581 |
| 4,088,729 | 5/1978 | Sherman | 264/263 |
| 4,487,729 | 12/1984 | Kaufman | 264/120 |
| 4,640,711 | 2/1987 | Lichti et al. | 264/125 |
| 4,747,898 | 5/1988 | Woltron | 264/263 |
| 4,789,512 | 12/1988 | Hughes | 264/120 |

FOREIGN PATENT DOCUMENTS

| | | | |
|---|---|---|---|
| 1141422 | 12/1962 | Fed. Rep. of Germany | 425/116 |
| 629221 | 3/1963 | France | 425/127 |
| 592521 | 2/1978 | U.S.S.R. | 425/110 |

*Primary Examiner*—Jay H. Woo
*Assistant Examiner*—C. Scott Bushey
*Attorney, Agent, or Firm*—Herbert Dubno; Ronald Lianides

[57] ABSTRACT

A precompact of flowable brake-lining composition is formed in an intermediate die by pressing the material in a direction perpendicular to the generatrices of the curved surfaces between which the material is pressed, whereupon the intermediate die is swung onto the hot-pressing die and the precompact transferred between synchronously driven rams into the hot-pressing die. A horizontal ram effects the final hot pressing of the precompact, advantageously directly bonding the same to a brakeshoe.

12 Claims, 1 Drawing Sheet

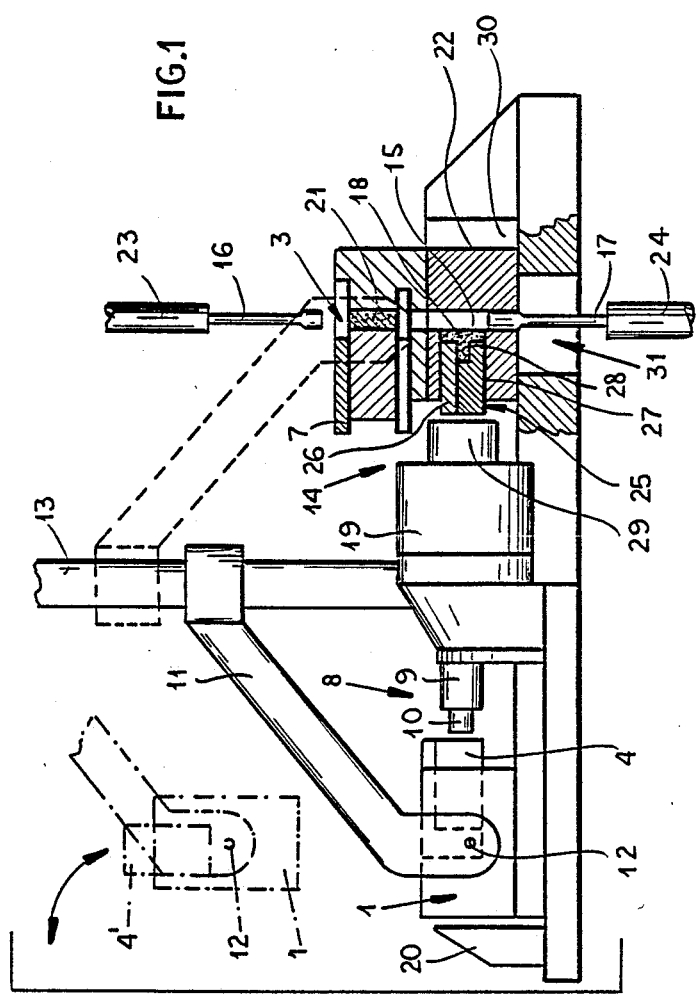
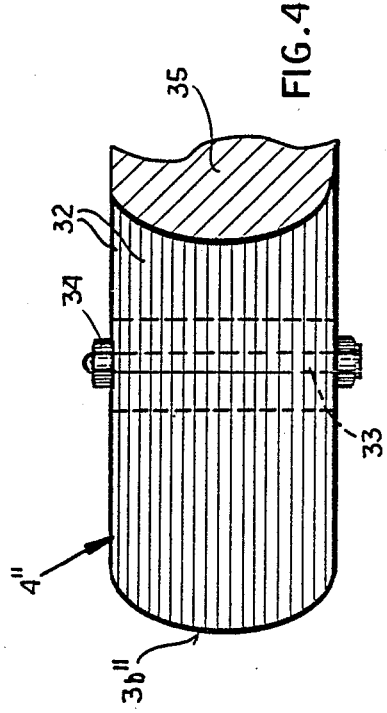
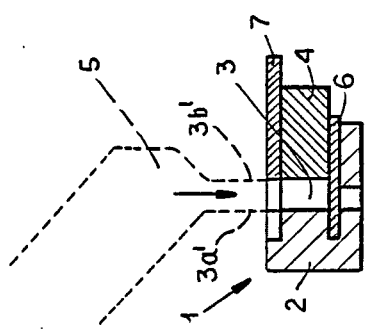
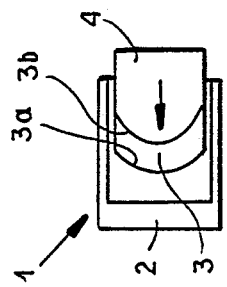

APPARATUS FOR PRESSING CURVED BRAKE LININGS, ESPECIALLY FOR DRUM-TYPE BRAKES

CROSS REFERENCE TO RELATED APPLICATION

This application is related to my copending application Ser. No. 07/251,859 filed Sept. 29, 1988.

FIELD OF THE INVENTION

My present invention relates to an apparatus for the pressing of curved brake members, especially brake linings and, when a support is bonded to the brake lining during the pressing process, to the fabrication of curved brakeshoes, especially for drum-type

BACKGROUND OF THE INVENTION

Drum-type brakes as are commonly used for motor vehicle wheel-braking systems and in many other applications, frequently known also as internal, expansion brakes, customarily make use of brakeshoes whose friction surfaces are formed by curved brake linings made by compression, generally under both heat and pressure, of a composite material including a thermally activatable binder.

The brake linings generally are circular-cylindrical segments and may be bonded, upon pressing, to a support to form the brakeshoe or may be otherwise secured to the metal support in the production of the brakeshoe.

In the conventional method of making such curved brake linings, a press ram is displaced downwardly toward a mold or die for shaping the material to be formed into the brake lining in the press.

The bottom of the mold or die is formed with a curved floor having the configuration of a circular cylindrical segment and rising along the edges of this wall are opposite bars of side walls lying in mutually parallel vertical planes.

In this curved-bottom mold or form, the composition which is to be bonded under heat and pressure to form the brake lining is introduced.

In the past, this composition has frequently been a fibrous mixture and is metered into the mold or form to a height sufficient to enable the desired thickness of the brake lining to be pressed by the press ram. The pressing may be carried out in one or more pressing stages and the end product is generally desired to have a predetermined and usually constant thickness and the desired density of the material. In practice this means that the end regions of the mold or form must be filled to a greater height with the composition than the region of the center line or axis.

Increasing demands for higher quality brake linings in recent years has led to the desire to use finely divided mixtures which have a granular consistency as distinct from the fiber structure of earlier compositions.

Such mixtures tend to be more flowable than the earlier compositions and it has been found that these mixtures are not readily able to retain the predetermined contour on a curved bottom. Furthermore, there are unavoidable vibrations in the operation of the system which cause flow of the material in the mold and often preclude the formation of uniform thickness, and not producing braking linings of uniform density as is essential for optimum braking results.

This is especially the case when the contour of the pile of the brake-lining composition in the mold is to conform to a parabola and is formed by a pattern, as is often the case.

OBJECTS OF THE INVENTION

It is, therefore, the principal object of the present invention to provide an improved apparatus or press for the formation of such brakeshoes whereby the aforementioned drawbacks will be avoided.

Another object of the invention is to provide an apparatus enabling the precise fabrication of brake linings for drum-type brakes wherein the pressed composition can be a pulverulent material but the pressed mass will have a predetermined surface contour and will yield a homogeneous high-quality end product, whether pressed into the brake lining alone or simultaneously bonded to the brakeshoe.

SUMMARY OF THE INVENTION

These objects and others which will become apparent hereinafter are attained, in accordance with the invention, in an apparatus for pressing curved brake linings for drum-type brakes which comprises an intermediate mold, die or form into which a fitting and metering device can charge a pulverulent and flowable brake-lining composition, this intermediate die having an arcuate or curved press chamber with oppositely disposed cylindrical surfaces, one of which forms the end face of an intermediate press ram.

According to an important aspect of the invention, this intermediate press ram presses the composition into a precompacted blank by movement in a direction normal (perpendicular) to the generatrices of the cylindrical surfaces.

A transfer manipulator is provided which preferably can be raised and lowered along a central column and can be rotated or swung around the latter, to engage the intermediate die and place the intermediate die upon the main shaping die of a hot press. The hot press, in turn, can have a main pressing ram for hot pressing the precompact in the main die after the latter has been transferred by sliders from the intermediate die into the pressing chamber of the hot press, these sliders serving also to eject the finished lining from the latter die.

The filling of the intermediate die, of course, can then be effected in the vertical direction along the generatrices of the cylindrical segmental surfaces bounding the intermediate die and the transfer of the precompact into the main die may likewise be effected along the generatrices of these cylindrical surfaces.

This ensures that the geometry of the brake lining will be maintained following the precompaction and during the final hot pressing.

Advantageously, the curvature of the end face of the intermediate pressing ram is variable and can be changed so that the same ram can be used, for example, in a succession of pressing spaces, to press the precompact with different radii of curvature.

In a particularly advantageous construction, the press ram can have a multiplicity of parallel parts in stacked relationship extending in the pressing direction and these parts can be set relative to one another by a cam, pattern or former, can be held in place relative to one another and can be displaced as a stack.

Advantageously, the ram of the hot press is divided parallel to the pressing direction and between its two parts defines an opening which opens toward the pressing chamber. The opening can serve to receive a rib of a backing plate or support plate for a brakeshoe so that the precompact can be hot-pressed directly against the backing plate and bonded thereto to form the brakeshoe.

According to a further feature of the invention, the sliders which are used to transform the precompact from the intermediate die to the hot pressing die can comprise a ram shiftable vertically and in the direction of the generatrices of the curved surfaces described, and a counterram similarly shiftable on the opposite side of the precompact. The transfer ram and its counterram can engage the precompact between them and transfer the precompact in an intact form into the hot pressing cavity. The transfer ram and counterram thus may be synchronously movable for this purpose.

More specifically, the apparatus for the production of curved brake linings or shoes for drum-type brakes can comprise:

an intermediate die including:
- an intermediate ram formed with a generally cylindrically segmental surface,
- an intermediate body having a generally cylindrically segmental surface confronting the surface of the intermediate ram, and
- means defining with the surface an intermediate-die cavity, the ram being displaceable in a direction normal to generatrices of the surfaces to precompress a brakeshoe composition in the cavity to a precompacted blank;

a metering and filling device positioned to charge the intermediate-die cavity with the brakeshoe composition prior to displacement of the ram in the direction;

a prepress removably receiving the intermediate die and provided with means for displacing the ram in the direction;

a hot press provided with:
- a hot-press ram,
- means defining a hot-pressing cavity shaped to receive the blank for further compression by the hot-press ram and heating to form a brakeshoe from the blank, and
- a pair of sliders adapted to engage the blank between them and displaceable generally parallel to the generatrices for transferring the blank from the intermediate die to the hot-pressing cavity while receiving the blank between the sliders, at least one of the sliders being displaceable to eject a formed brakeshoe from the cavity; and a manipulator engageable with the intermediate die for carrying the intermediate die from the prepress to the hot press and aligning the intermediate-die cavity with the hot-pressing cavity and the sliders for transfer of the blank between the sliders from the intermediate-die cavity to the hot-pressing cavity.

Specifically, a post can be deposed centrally between the prepress and the hot press, the manipulator being mounted to swing around the post to carry the intermediate die from one side thereof to the other side of the post.

BRIEF DESCRIPTION OF THE DRAWINGS

The above and other objects, features and advantages of the present invention will become more readily apparent from the following description, reference being made to the accompanying drawing in which:

FIG. I is a side elevational view in highly diagrammatic form and partly broken away, illustrating part of the apparatus of the invention;

FIG. 2 is a section through the intermediate form or die of FIG. 1 showing the cooperation of the metering and feed device therewith;

FIG. 3 is a plan view of the die seen in FIG. 2 but with the upper plate removed; and FIG. 4 is a plan view illustrating the setting of the curvature of the intermediate ram utilizing a pattern or former.

SPECIFIC DESCRIPTION

As can best be seen from FIGS. 2 and 3, an intermediate die 1 for the purposes of the invention, comprises a die body 2 with a pressing chamber 3 which can be filled with a flowable pulverulent brake-lining composition. The chamber 3 is defined between a pair of cylindrically segmental curved surfaces 3a and 3b which have vertical generatrices 3a' and 3b', respectively.

The cylindrical segmental surfaces need not precisely conform to a segment of a right circular cylinder as should be clear from the illustration in FIG. 3.

One of these surfaces is formed by the end face of an intermediate press ram 4, which can be horizontally shifted into the pressing chamber 3.

When the upper plate 7 of the die is retracted, the chamber 3 can be filled with the pulverulent material by a metering and filling device 5 of which only a chute has been illustrated in FIG. 2. The chamber 3 is defined between the retractable plates 6 and 7 as well.

The intermediate die 1 is removably mounted in the apparatus shown in FIG. 1 which comprises a prepress 8 with a hydraulic cylinder 9 and a piston 10 engageable with the intermediate ram 4 to displace the latter horizontally, i.e. in a direction perpendicular to the generatrices 3a' and 3b'. An anvil 20 braces the intermediate die against the force of the piston 10. The intermediate die 1 is mounted in a manipulator 11 for lifting, swinging and rotating motion.

After a precompaction of the material within the die cavity 3 by the ram 4 and the piston 10 to form a precompact 21, with the plates 6 and 7 closing the upper and lower ends of the chamber 3, the intermediate die 1 can be carried into the dot-dash line position shown in FIG. 1 to enable the ram 4 to be replaced by another ram 4' which may have a somewhat flatter curved end face without damaging the precompact. The intermediate die can then be replaced in the prepress 8 and the prepressing continued until the precompact has attained its desired shape and density.

The manipulator 11, which can be raised and lowered on the central post 13 and swung therearound then lifts the intermediate die 1 from the prepress and swings it through 180° about the post 13 onto the main die 22 of the hot press 14.

The intermediate die 1 is sc positioned on the hot-pressing die 22 that the pressing chamber 3, upon retraction of the plates 6 and 7, registers with the main pressing chamber 15.

The precompact 21 is engaged between the transfer slider or ram 16 and the counterslider or ram 17 both of which are displaceable by respective cylinders 23 and 24 so that the precompact is seized between these two rams.

By synchronous displacement of the transfer ram 16 and the counterram 17 downwardly, the precompact I is shifted into the pressing chamber 15.

The ram 25 of the hot press is divided into an upper part 26 and a lower part 27 defining a groove 28 between them. This groove receives the rib of a preform backing plate 18, made of sintered metal, for example, and forming the end of the ram 25 so that the backing plate is bonded to the lining pressed from the precompact during the hot-pressing operation.

The ram 25 is driven horizontally to the right by a piston 29 of the hot-pressing cylinder 19, the die 22 being braced by a support 30.

After the hot pressing has been completed, the press can be opened by shifting the member 27 to the left and opening the die to permit the ram 16 to eject the completed brakeshoe through the opening 31 beneath the die 22.

Naturally, the precompact can also be heated in the intermediate die to activate any meltable bonding materials in the composition if required. In other words, a reference to precompaction or prepressing does not exclude use of heat in the prepressing operation. What is important, of course, is that the precompact need not have the final density and dimensions of the brake lining so that it can be further compressed in the hot press. It will be understood also that the hot-pressing operation itself need not be only a single stage but can, if desired, involve a multiplicity of stages and in which in a final stage, a number of brake linings can be simultaneously hot-pressed.

FIG. 4 shows a variant of the intermediate ram 4" which can be used by adjustment of the curvature of its surface 36' in a succession of stages or for the fabrication of brake linings of different contours. The ram 4" comprises a stack of plates 32 having elongated holes except for the terminal plates and through which a bolt 33 can pass so that upon tightening of the nut 34, the plate of the stack are clamped together. The setting of the positions of the plates, while the nut 34 is somewhat loose, can be effected through the use of a pattern 35.

Once the clamp is tightened, the ram with its adjusted surface 3b" can be pressed against the brake-lining composition to form the precompact in the manner described.

I claim:

1. An apparatus for the production of curved brake shoes for drum-type brakes, said apparatus comprising:
   an intermediate die including:
   an intermediate ram formed with a generally cylindrically segmental surface,
   an intermediate body having a generally cylindrically segmental surface confronting said surface of said intermediate ram, and
   means defining with said surface an intermediate-die cavity, said ram being displaceable in a direction normal to generatrices of said surfaces to precompress a brakeshoe composition in said cavity to a precompacted blank;
   a metering and filling device positioned to charge said intermediate-die cavity with said brakeshoe composition prior to displacement of said ram in said direction;
   a prepress removably receiving said intermediate die and provided with means for displacing said ram in said direction;
   a hot press provided with:
   a hot-press ram, and hydraulic piston means for actuating said ram;
   means defining a hot-pressing cavity shaped to receive said blank and a preform backing plate, said hot-press ram including heating means to bond said blank to said backing plate, whereby said precompacted blank undergoes further compression by said hot-press ram;
   a pair of opposed sliders arranged vertically above and below said intermediate die, said sliders being provided with actuation means to engage said blank between them and being displaceable generally parallel to said generatrices for transferring said blank from said intermediate die to said hot-pressing cavity while receiving said blank between said sliders, at least one of said sliders being displaceable to eject a formed brakeshoe from said cavity subsequent to actuation of said hot-press ram; and
   a manipulator engageable with said intermediate die for carrying out intermediate die from said prepress to said hot press and including means for vertically aligning said intermediate-die cavity with said hot-pressing cavity whereby said sliders are actuated to transfer said blank from said intermediate-die cavity to said hot-pressing cavity.

2. The apparatus defined in claim 1, further comprising a post disposed centrally between said prepress and said hot press, said manipulator being mounted to swing around said post to carry said intermediate die from said prepress to alignment with said hot-press.

3. The apparatus defined in claim 2 wherein the curvature of said generally cylindrically segmental surface of said intermediate ram is variable.

4. The apparatus defined in claim 3 wherein said intermediate ram is composed of a plurality of parallel parts relatively shiftable by respective curved formers, said parts being secured together for joint movement as a stack to prepress said blank.

5. The apparatus defined in claim 4 wherein said hot-press ram is divided parallel to the direction of displacement thereof into two ram parts, said ram parts defining a recess between them opening toward said hot-pressing cavity.

6. The apparatus defined in claim 5 wherein said sliders include a transfer ram for shifting said blank out of said intermediate cavity into said hot-pressing cavity and a counterram, said transfer ram and said counterram being synchronously movable by said slider actuation means.

7. The apparatus defined in claim 6 wherein said intermediate and hot-press rams are displaceable horizontally and are disposed diametrically on opposite sides of said post, said sliders being displaceable vertically and said generatrices being vertical.

8. The apparatus defined in claim 7 wherein said means defining said intermediate-die cavity include a pair of horizontally slidable plates closing said intermediate-die cavity at a top and bottom thereof in said prepress, said plates being retractable by actuation means in said hot press and at least the plate closing said top of said intermediate-die cavity being retractable by said actuating means to allow for charging said brakeshoe composition into said intermediate-die cavity.

9. The apparatus defined in claim 2 wherein said hot-press ram is divided parallel to the direction of displacement thereof into two ram parts, said ram parts defining a recess between them opening toward said hot-pressing cavity.

10. The apparatus defined in claim 2 wherein said sliders include a transfer ram for shifting said blank out of said intermediate cavity into said hot-pressing cavity and a counterram, said transfer ram and said counterram being synchronously movable by said slider actuation means.

11. The apparatus defined in claim 2 wherein said intermediate and hot-press rams are displaceable horizontally and are disposed diametrically on opposite sides of said post, said sliders being displaceable vertically and said generatrices being vertical.

12. The apparatus defined in claim 2 wherein said means defining said intermediate-die cavity include a pair of horizontally slidable plates closing said intermediate-die cavity at a top and bottom thereof in said prepress, said plates being retractable by actuation means in said hot press and at least the plate closing said top of said intermediate-die cavity being retractable by said actuation means to allow for charging said brake-shoe composition into said intermediate-die cavity.

* * * * *